June 5, 1951
W. C. TRAUTMAN
2,555,427
HYDRAULIC PUMPING SYSTEM WITH PRELOADED
HYDRAULIC SHOCK ABSORBER
Filed June 23, 1947
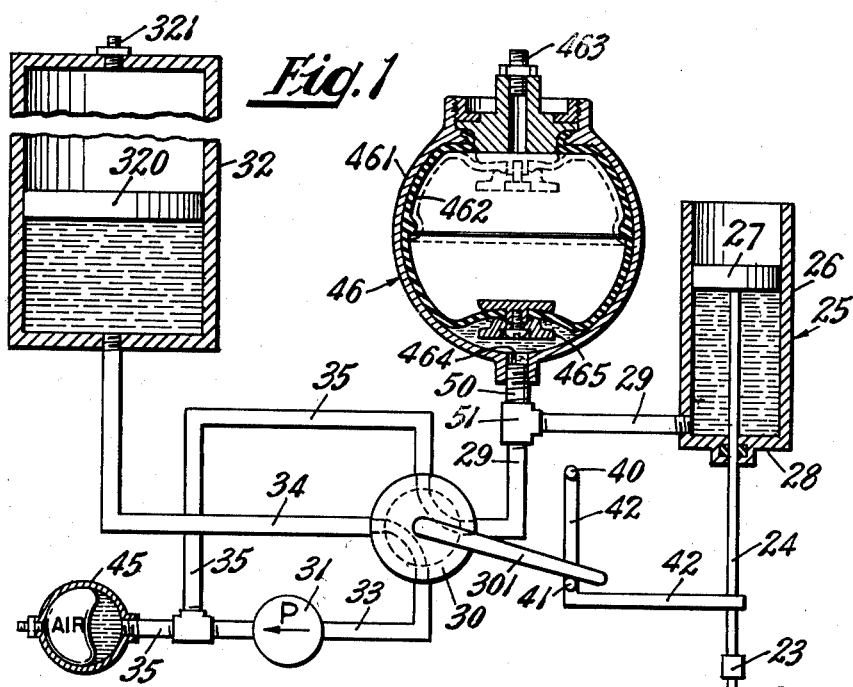
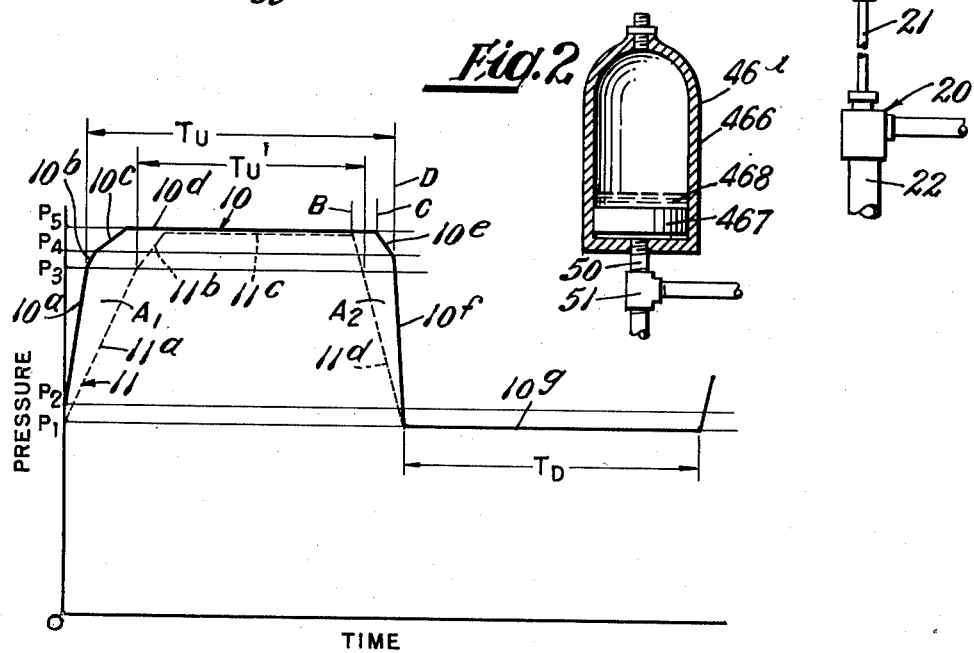
INVENTOR.
WALTER C. TRAUTMAN
BY Woodbury
ATTORNEY Patented June 5, 1951

2,555,427

UNITED STATES PATENT OFFICE 2,555,427

HYDRAULIC PUMPING SYSTEM WITH PRE-LOADED HYDRAULIC SHOCK ABSORBER

Walter C. Trautman, Los Angeles, Calif., assignor to Bendix Aviation Corporation, South Bend, Ind., a corporation of Delaware Application June 23, 1947, Serial No. 756,448

1 Claim. (Cl. 60—51)

This invention relates to the problem of driving the pump rod of an in-the-well pump, and is particularly useful in pumping relatively deep wells such as oil wells.

The most common type of drive heretofore employed with in-the-well pumps is mechanical, employing a walking beam one end of which is connected to the pump rod and the other end of which is connected by a connecting rod to a crank shaft rotated by a motor. A defect of such drives is that the motion applied to the pump rod is at least approximately harmonic, the rod being accelerated through the first half of each stroke and decelerated during the latter half, so that the stresses developed in the rod vary widely in different portions of the stroke. Since the maximum stress is determined by the strength of the rod, this means that during a substantial portion of each pumping stroke the rod is not being stressed anywhere near its limit. The result is inefficient pumping.

The defects of mechanical drives have been recognized, and it has been suggested to use hydraulic drives in which the pump rod is connected to the plunger or piston of a hydraulic jack which is supplied with actuating fluid by a motor driven pump. The prior art development in this direction that is most pertinent (to the best of applicant's knowledge) to the present invention is represented by Bays Patent 2,141,703 issued December 27, 1938.

The Bays patent shows a hydraulic jack connected to the pump rod, a counter-balancing accumulator for partly balancing the weight of the pump rod and the liquid column being pumped, a pump, and a reversing valve for causing the pump to first pump hydraulic actuating fluid from the counter-balancing accumulator into the jack to raise the pump rod, and then pump fluid from the jack into the counter-balancing accumulator to lower the pump rod, the cycle being repeated continuously. For the stated purpose of absorbing the sudden intertia forces to which the pumping equipment is subjected, particularly those inertia forces incident to the reversal of the equipment, the patent provides a shock absorbing chamber having fluid in its lower portion and air in its upper portion, and directly connected at its lower end to the pump jack. Such a shock absorber opposes all pressure changes in the jack, and, if its air space is made large enough, it will absorb all the fluid from the pump and prevent any operation of the pumping jack. On the other hand, if the air space is made very small the shock absorbing chamber will absorb only slight shocks.

Therefore, a shock absorber as disclosed in the Bays patent is of relatively limited value for the purpose of reducing peak stresses in the rods, because if it is made large enough to have any real equalizing effect on the fluid pressure in the jack, it will absorb and waste a substantial portion of the actuating pressure fluid.

A broad object of the present invention is to improve and increase the efficiency of hydraulic pumping systems.

A more specific object is to provide a pumping system that is capable of maintaining a substantially constant force on a pump rod throughout the pumping stroke whereby the rod can be stressed substantially to its safe limit through the full length of the stroke.

The present invention constitutes an improvement in systems of the type disclosed in the Bays patent having a shock-absorbing accumulator connected to the hydraulic pump jack for preventing development of excessive forces in the pump rod, and, briefly, the improvement consists in the use of a preloaded accumulator as the shock absorber.

By a preloaded accumulator is meant one having provision for preventing the escape of compressed air (or other gas) therein, so that the minimum air pressure therewithin can be substantially the same as the maximum desired working pressure in the pumping jack. Under these conditions, little or no fluid is by-passed from the pumping jack into the accumulator unless the pressure rises above the maximum safe pressure (determined by the strength of the rod) and which is above the maximum average working pressure. Therefore, little or no actuating fluid is wasted in the shock absorber and its full capacity is available to iron out shocks and maintain a very nearly constant, powerful lift on the rod throughout its upstroke.

Whereas in the prior art systems, the effectiveness of the shock absorber in limiting stresses on the pump rod was limited by the fact that its size had to be a compromise, in the present system the shock absorbing accumulator can be as large as necessary to prevent shock loads on the rod, without wasting power and delaying the starting and stopping of the upstroke.

A full understanding of the invention, together with specific objects and features thereof will be apparent from the following detailed description with reference to the drawing, in which:

Fig. 1 is a schematic diagram of a system in accordance with the invention;

Fig. 2 is a vertical sectional view illustrating an alternative accumulator construction that can be employed in the system of Fig. 1; and Fig. 3 is a graph illustrating the operation of the system of Fig. 1 in comparison with the prior art systems.

Referring to Fig. 1, there is shown a fitting 20 at the upper end of a pumping well from which projects the conventional polished rod 21, this rod being connected within the well tubing 22 to a string of sucker rods which extends down through the tubing to a reciprocating pump located within the well. The polished rod 21, together with the sucker rods, constitute the pump rod which will hereinafter be referred to as such.

There is connected to the upper end of the polished rod 21, by a connector 23, the piston rod 24 of a hydraulic jack 25. As shown, this jack 25 consists of a cylinder 26 containing a piston 27 to which the piston rod 24 is connected, the latter extending through a suitable seal in the lower end wall 28 of the cylinder 26. The upper end of the cylinder 26 may be open, to expose the upper end of the piston 27 to atmospheric pressure at all times. It will be observed that if pressure fluid is alternately directed into and withdrawn from the lower end of the jack cylinder 26, the piston 27 will be raised and lowered to reciprocate the pump rod. Suitable means for alternately delivering fluid to and withdrawing fluid from the jack may include a pipe 29, a four-way valve 30, a pump 31, a counterbalancing accumulator 32, and pipes 33, 34, and 35. It will be observed that in the position shown, the pump 31 draws fluid from the accumulator 32 through the pipe 34, the valve 30, and the pipe 33, and delivers it through the pipe 35, the valve 30, and the pipe 29 to the jack 25 to lift the piston 27 and the pump rod. When the handle 301 of the valve 30 is rocked 90° counterclockwise from the position shown, the pump 31 withdraws fluid from the jack 25 through the pipe 29, the valve 30, and the pipe 33, and delivers it through the pipe 35, the valve 30, and the pipe 34 into the counterbalancing accumulator 32.

As shown, the counterbalancing accumulator 32 consists of a cylinder containing a floating piston 320 which separates the interior of the cylinder into an upper air compartment and a lower fluid compartment. A suitable valve fitting 321 may be provided in the upper end of the cylinder 32 for initially charging the accumulator with air or other gas at a suitable pressure. If the air pressure within the accumulator 32 is made equal to about half the pressure in the jack 25 required to support the pump rod and liquid column in the well, the work of the pump 31 is substantially equalized during the up and down strokes of the jack, the weight of the pump rod and liquid column in the well aiding the pump 31 in storing energy in the counterbalancing accumulator 32 during the downstroke of the jack, which stored energy aids the pump 31 in lifting the pump rod and liquid column during the next upstroke.

The handle 301 of the valve 30 is shown actuated by a pair of pins 40 and 41 secured to a frame 42 which is attached to the piston rod 24 for reciprocation therewith. When the jack piston nears the upper end of its stroke the pin 41 contacts the lever 301 to shift it into "down" position (the position displaced 90° counterclockwise from that shown in Fig. 1), and when the jack piston 27 nears the lower end of its stroke, the pin 40 shifts the lever 301 into its "up" position (the position shown in Fig. 1). It is to be understood that the showing of the valve 30, and particularly the manner in which it is actuated, is purely schematic. Suitable mechanisms for actuating the valve 30 are known to those skilled in the art, one such arrangement being illustrated in the Bays Patent 2,141,703 previously referred to, and another in the patent application of W. C. Trautman and Ezra Hollister, Serial No. 618,184 filed September 24, 1945, to which reference is made. The specific form of the valve 30 and its actuating mechanism does not constitute per se a part of the present invention.

There is shown connected to the pipe 35 a small hydraulic accumulator 45 which may be of conventional construction such as shown in my Patent 2,378,517 issued June 19, 1945. This accumulator 45 serves to absorb fluid from the pump 31 while the valve 30 is being moved from one position to the other, and thereafter return the fluid to the system before the next reversal.

There is shown connected to the pipe 29 an accumulator 46. This accumulator may also be of the type shown in my Patent 2,378,517, having a substantially spherical container 461 and a bladder 462 for containing the compressed air and preventing contact between the air and the actuating fluid. A valve fitting 463 may be provided at one end of the container 461 for admitting compressed air into the bladder 462 at suitable pressure. The container 461 is shown communicated at its lower end with the pipe 29 through a nipple 50 and a T 51. When the pressure within the bladder 462 exceeds the pressure between the bladder and the container 461, the bladder expands to completely fill the container and a button 465 in the end of the bladder covers the opening 464 which leads to the nipple 50 to prevent extrusion of the rubber bladder through the opening.

The system as so far described is functionally equivalent to the system of the Bays Patent 2,141,703 except for the action of the hydraulic accumulator means 46.

In the Bays patent, the corresponding accumulator is a vessel containing actuating fluid in the lower portion and compressed air in the upper portion with nothing in the nature of a partition wall separating the fluid and the air. As a result, the Bays accumulator cannot be preloaded, because the air, if at higher pressure than the actuating fluid, would escape from the accumulator into the pump jack, thereby preventing it from operating properly. Hence in the Bays system the quantity of air in the accumulator must be such that before all actuating fluid is discharged from the accumulator the pressure therein will have dropped to the lowest value that ever obtains in the jack. The result is that every variation of pressure in the jack in the Bays system causes a flow of actuating fluid into or out of the accumulator.

In contrast, in my system, the accumulator 46 can be preloaded with compressed air at a pressure very close to the maximum pressure that ever exists in the jack 25, and during a large part of each cycle there is no actuating fluid in the accumulator 46, and the bladder 462 is completely expanded against the container 461. However, when the pressure within the jack 25 closely approaches the desired operating pressure (which is slightly above the initial pressure of the air in the accumulator 46), fluid can flow into the accumulator to prevent any further appreciable increase of pressure in the jack 25.

It is important to note that the accumulator 46 can be made relatively large, so that the pressure therein increases only slightly in response to ingress of a substantial quantity of actuating fluid. Hence the system is capable of preventing abnormal rises in pressure and consequent stresses in the pump rod even though the conditions tending to create the excessive pressures are relatively strong and last for a substantial length of time. In contrast, an accumulator such as that of Bays, that is not preloaded, must be of small capacity, else it will absorb and waste a substantial quantity of pumped fluid during each cycle.

The accumulator 46 can be provided with a large liquid opening, and the nipple 50, T 51, and the section of pipe 29 between the T and the jack 25 can be short and large, to permit rapid flow into and out of the accumulator in response to pressure changes in the jack, thereby minimizing such changes.

The manner in which the present system promotes efficiency is clearly shown in the graph of Fig. 3, in which the solid curve 10 indicates the characteristics of the present system and the dotted curve 11 indicates the characteristics of the same system employing an accumulator that is not preloaded.

Referring to Fig. 3, the curves 10 and 11 show variations in pressure during the course of each complete pumping cycle. The pressure $P_1$ is the pressure at which fluid from the pump 31 begins to be absorbed into an accumulator that is not preloaded. This pressure must be at least as low as the minimum pressure prevailing in the jack during any part of the cycle. The pressure $P_2$ is the pressure in the jack 25 that will just support the pump rod when it is stationary. The pressure $P_3$ is the pressure in the jack 25 that will just support the pump rod and the column of pumped liquid in stationary condition. It will be apparent therefore that in order for the pump rod to descend, the pressure must be less than pressure $P_2$, and it is assumed that this pressure will be $P_1$. It is also apparent that in order for the pump rod to move upwardly, and raise the liquid column, the pressure in the jack 25 must be in excess of pressure $P_3$. In order to work the pump to its utmost capacity, the pressure during the pumping stroke should be sufficient to stress the pump rod to its safe limit. It may be assumed that in Fig. 3 this pressure is pressure $P_5$. The pressure $P_4$ is the pressure at which the preloaded accumulator 46 begins to absorb actuating fluid from the pipe 29. This pressure is intermediate pressures $P_3$ and $P_5$. It is preferably sufficiently less than pressure $P_5$ to insure that some fluid will remain in the accumulator 46 throughout most of the upstroke and thereby prevent chattering of the button 465 against the container 461 surrounding the opening 464.

In a system as described, let it be assumed that the valve 30 is thrown into the "up" position shown in Fig. 1 at zero time (Fig. 3). Fluid immediately begins to flow from the pump 31 through the pipe 35, the valve 30, and the pipe 29 into the jack 25, and the pressure therein rises rapidly as indicated by the line 10a, the steepness of which depends only upon the compressability of the actuating fluid and the general expansibility of the pipes and cylinders containing the fluid. At pressure $P_3$, the jack is able to lift the rod and liquid column load, and the stroke begins. Thereafter, the pressure continues to rise, but less rapidly, to pressure $P_4$, as indicated by the line 10b, since the jack is beginning to absorb part of the pump output. When the pressure reaches pressure $P_4$ the accumulator 46 begins to absorb actuating fluid and the pressure thereafter increases even more slowly to the full operating pressure $P_5$, as indicated by the line 10c.

According to the graph of Fig. 3, the pressure remains constant during the major portion of the pump stroke, as indicated by the line 10d. Actually, there will be variations in the pressure in the jack during this interval of time, because of variations in the rod load due to uncontrollable factors such as the distributed stretch and inertia of a long pump rod. In a system in which no effort is made to equalize the stresses in the pump rod, they vary over wide limits, with the result that the average stress that can be maintained during the upstroke is much less than the maximum safe stress the pump rod can withstand. In the present system, however, the variations in stress in the rods will be very slight because of the capacity of the preloaded accumulator 46 to rapidly absorb fluid when the pressure tends to increase, and to rapidly supply fluid when the pressure tends to decrease.

In Fig. 3, the time of reversal of the valve 30 from the "up" position shown in Fig. 1 to the "down" position is indicated at C, the valve cutting off the delivery of fluid through pipe 29 at time C, and permitting withdrawal of fluid by the pump through pipe 29 at time D. The pressure therefore begins to drop at time C, but gradually, because fluid is supplied to the jack from the accumulator 46 until time D, at which time all fluid has been returned from the accumulator 46, and the jack is connected to the input of the pump so that the pressure thereafter drops rapidly as indicated by the line 10f. The line 10f is very steep because no fluid is being supplied by the accumulator 46 at this time. As soon as the pressure drops below $P_2$ the pump rod and the jack piston begin to descend, and the pressure may remain substantially constant during the downstroke as indicated by the horizontal line 10g. It will be observed that the time $T_U$ of the "up" or pump stroke is relatively long.

Referring now to the dotted line 11 in Fig. 3, it will be observed that when the accumulator is not preloaded the pressure rises very gradually in the jack at the beginning of the "up" stroke, as indicated by the line 11a, because part of the output of the pump is flowing into the accumulator and increasing the pressure therein. When the pressure reaches $P_3$ the stroke begins and thereafter the pressure rises even more gradually to the maximum value $P_5$, as indicated by the line 11b. Thereafter, the pressure remains constant, as indicated by the line 11c, which is coincident with a portion of the line 10d. However, the valve must reverse at time B, in advance of the time C, because the accumulator must discharge a substantial quantity of fluid before the pressure can drop to the value $P_2$ and permit the downstroke to begin. The decrease in the pressure in the jack following time B is indicated by the dotted line 11d.

It will be observed that with the unloaded accumulator the time of the upstroke $T_U'$ must therefore be a smaller fraction of the complete cycle than in the case of the preloaded accumulator as represented by $T_U$. Since the actual time required to complete the upstroke depends upon the force applied by the jack to the pump rod, and this force is limited by the strength of the rod, the pumping cycle must be slower in the case of the accumulator that is not preloaded, or a full stroke will not be completed.

Referring again to Fig. 3, the area $A_1$ bounded by the lines 10a, 10b, 10c, 11a, 11b and a portion of 10d represents energy that is lost in compressing air in a shock absorbing accumulator that is not preloaded. The area $A_2$ bounded by the lines 11d, 10f and 10e and a portion of line 10d represents the discharge of energy previously stored. The discharge of this fluid after the valve 30 has reversed causes the force applied by the jack to the pump rod to drop slowly, thereby delaying the downward movement of the pump rod. The areas under the curves 10 and 11, respectively, represent the relative pumping efficiencies of pumps having preloaded and non-preloaded shock-absorbing accumulators, and the sum of the areas $A_1$ and $A_2$ represents the improvement in efficiency obtained with the present invention.

It is to be understood that the type of accumulator shown at 46 in Fig. 1 is not the only type that can be preloaded. There is shown in Fig. 2 a form of accumulator 46a similar to the accumulator 32 in Fig. 1. Thus the accumulator 46a in Fig. 2 may consist of a container having a cylindrical section 466 containing a piston 467 which constitutes a sliding partition wall between air in the upper portion of the container and actuating fluid in the lower portion. A small quantity 468 of a liquid not capable of absorbing appreciable air can be provided on top of the piston 467 to assist in maintaining a seal between it and the wall of the container. Whenever the pressure in the pipe 50 leading to the accumulator 46a drops below the preloading pressure, the piston 467 drops to the lower limit of its travel and prevents escape of air. However, whenever the pressure in the pipe 50 rises above the preloading pressure the piston 467 rises to permit entry of fluid.

Although for the purpose of explaining the invention, a particular embodiment thereof has been shown and described, obvious modifications will occur to a person skilled in the art, and I do not desire to be limited to the exact details shown and described.

I claim:

Apparatus for cyclically reciprocating the pump rod of an in-the-well pump comprising: a hydraulic jack adapted to be connected to the pump rod for lifting the rod in response to supply of actuating fluid, and lowering it in response to release of fluid; means for cyclically alternately delivering fluid at a pressure in a first range to said jack and withdrawing fluid from said jack at a pressure in a second substantially lower range to reciprocate the rod; and a shock absorbing hydraulic accumulator means connected to said jack for preventing excessive pressure peaks therein; said apparatus being characterized in that said accumulator means comprises a container having a freely movable partition dividing it into a pair of variable volume chambers, one a fluid chamber directly connected to said jack for substantially unimpeded flow of fluid thereto and therefrom, and the other a gas chamber containing a gas the pressure of which at maximum volume condition of the gas chamber is substantially greater than said second pressure range but is less than the jack pressure corresponding to maximum safe rod stress, whereby power-wasting diversion of actuating fluid from said jack into said accumulator during safe pressure portions of the pumping cycle is reduced and the reserve capacity of the accumulator to absorb dangerous pressure peaks is increased.

WALTER C. TRAUTMAN.

REFERENCES CITED

The following references are of record in the file of this patent:

UNITED STATES PATENTS

| Number | Name | Date |
|---|---|---|
| 1,450,372 | Irish | Apr. 3, 1923 |
| 2,141,703 | Bays | Dec. 27, 1938 |
| 2,170,890 | Allen | Aug. 29, 1939 |
| 2,239,481 | Christensen | Apr. 22, 1941 |
| 2,264,375 | Hill | Dec. 2, 1941 |
| 2,282,977 | Mast | May 12, 1942 |
| 2,283,516 | Tyler | May 19, 1942 |
| 2,347,379 | Teeter | Apr. 25, 1944 |